March 4, 1969  R. W. GUERTLER  3,430,866

FUEL INJECTION NOZZLE

Filed March 31, 1967

INVENTOR
RUDOLF W. GUERTLER

ATTY 3,430,866
FUEL INJECTION NOZZLE
Rudolf W. Guertler, Fort Wayne, Ind., assignor to International Harvester Company, Chicago, Ill., a corporation of Delaware
Filed Mar. 31, 1967, Ser. No. 627,352
U.S. Cl. 239—533
Int. Cl. B05b 1/30; F02m 45/04
4 Claims

ABSTRACT OF THE DISCLOSURE

A fuel injection nozzle wherein means is provided to reduce undesirable initial high rates of injection. This means comprises a chamber associated with the needle valve to which a portion of the fuel is diverted during the injection cycle to cut the "peak" from the initial high rate of injection.

---

This invention relates to fuel injection nozzle and more particularly to an improved nozzle in which means is provided to reduce undesirable high initial fuel injection rates.

In some fuel injection systems, it has been observed that initial high rates of injection have adverse effects including incomplete combustion, reduced power, and decreased engine efficiency. Since the charge of fuel which stands ready to be injected through a fuel injector nozzle is under extremely high pressure, when the nozzle valve opens the high pressure causes an initial high rate of injection.

The purpose of this invention is to reduce this undesirable initial high rate of injection. This is done by diverting some of the pressurized fuel which would otherwise be injected into the engine cylinder to a separate chamber associated with the fuel injector device. Since this decreases the amount of fuel to be injected initially, the amount injected during the injection cycle starts with a relatively smaller amount and builds up throughout the cycle.

Accordingly, it is a principal object of this invention to provide an improved fuel injector device which will be effective to make more efficient use of the fuel supplied to the engine with which the injector is associated.

Another object is to provide in a fuel injector device means for reducing undesirable initial high rates of injection.

Another object is to provide in a fuel injector device means for diverting pressurized fuel from the fuel injection nozzle at the beginning of an injection cycle to reduce the initial high rate of injection.

A further object of this invention is to provide chamber means associated with the needle valve of a fuel injector device to which fuel may be diverted to control the initial high rate of injection.

Still another object is to provide means associated with the needle valve of a fuel injector device for controlling the initial high rate of injection, which comprises groove means formed on the outer periphery of the needle valve to receive diverted fuel.

The above and other objects and advantages of the invention will be more readily apparent when read in conjunction with the accompanying drawings in which.

Figure 1:
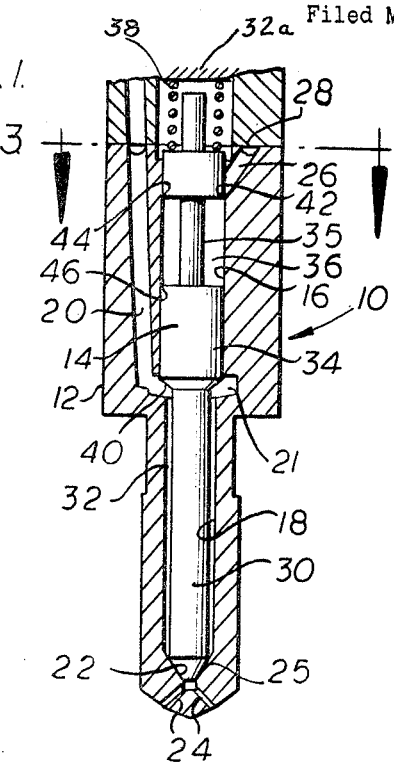
FIGURE 1 is a sectional view in elevation of a fuel injection nozzle embodying the present invention showing a needle valve in a nozzle body in a closed position.

Referring now to the drawings wherein like reference characters on the different views identify similar parts, the device shown in FIGURE 1 represents a fuel injection nozzle 10 which comprises a needle valve body 12 and a needle valve 14. The valve body 12 has a longitudinally extending bore 16 formed in the upper portion thereof in which the needle valve 14 is disposed for longitudinal reciprocation. A close sliding fit exists between the needle valve 14 and the bore 16. A second and smaller bore 18 is formed in the lower portion of the valve body 12 to accommodate the lower portion of the needle valve 14. A passage 20 adapted to be connected to a source of fuel under pressure such as from a fuel injection pump, is also formed in the valve body 12 and is here shown as being formed in the upper portion of the valve body. The fuel passage 20 connects to a main fuel chamber 21 surrounding the needle valve 14. A conical valve seat 22 is formed in the valve body 12 at the lower end of the bore 18. One or more nozzle orifices 24 are formed in the lower end of the valve body 12 and communicate with the lower end of bore 18. A secondary fuel passage or duct 26 is formed in the upper portion of the valve body 12 and is disposed to communicate with the bore 16, the purpose of which will be more fully explained.

An annular passage 28 formed in the upper face of the valve body 12 connects the passage 20 with the passage 26 so that fuel from the fuel supply source to which the passage 20 is adapted to be connected will also flow to the passage 26.

Figure 2:
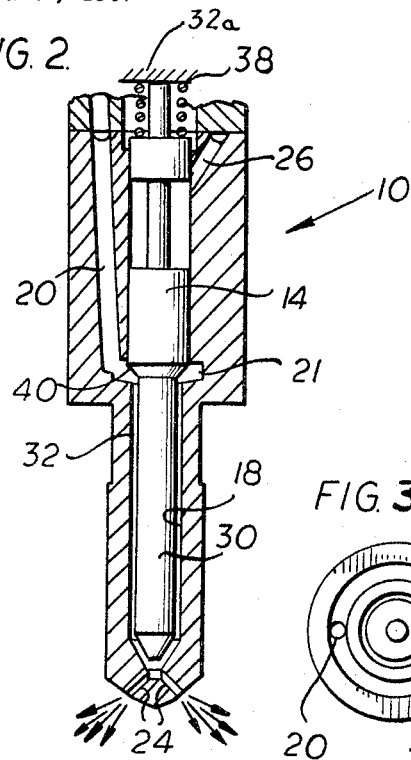
FIGURE 2 is a sectional view in elevation of a fuel injection nozzle as shown in FIGURE 1 but showing the valve in its open position.
Figure 3:
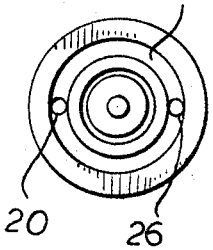
FIGURE 3 is a view along line 3—3 of FIGURE 1 showing an annular passageway connecting main and secondary fuel passages.

The needle valve 14 has a conical surface 25 formed on the lower end thereof to seat on the valve seat 22. The lower end of the needle valve 14 is formed with a reduced diameter portion 30 having a diameter slightly smaller than the bore 18 so that a circumferential fuel passage 32 is formed between the needle valve lower end 30 and bore 18. This passage establishes communication between the fuel pasage 20, the fuel chamber 21 and the nozzle orifice 24 when the needle valve 14 is unseated and in its fully opened position as shown in FIGURE 2. When in its fully opened position, the uppermost end of the needle valve 14 abuts a positive stop 32a, shown somewhat diagrammatically in FIGURES 1 and 2, to limit axial movement of the needle valve 14 in one direction.

As previously noted, the upper portion 34 of the needle valve 14 makes a close sliding fit with the bore 16. The upper portion 34 has a wide circumferential groove 35 formed therein. This groove 35 with the adjacent part of the bore 16 defines a chamber 36 for receiving diverted fuel during operation of the fuel injection device 10. It is contemplated that groove 35 be of substantial axial extent so as to define a chamber 36 of relatively large volume and capacity. As here shown, the groove extends along approximately 40% of the length of the upper portion 34 of the needle valve 14 but this is not to be construed as limiting the size thereof. The size of groove 35 is one of the elements that may be changed to vary the fuel injection characteristics. Its length and depth may be varied as desired. The number of grooves as well as their size may also be varied.

FIGURE 1 shows the needle valve 14 in its normally closed or seated position, the valve being held in that position by a spring 38 in a conventional manner as is well known in the art. FIGURE 2 shows the needle valve 14 forced into its open position against the pressure of a spring 38 by pressurized fuel in the fuel chamber 21 acting against the underside 40 of the upper portion of needle valve 14.

It will be observed from FIGURE 1 that with the needle valve 14 in a seated or closed position, the passage or duct 26 is blocked by a shoulder 42 on the needle valve so that fuel cannot enter the chamber 36 via the passage 26.

When the fuel pressure in the passages 20 and 32 and fuel chamber 21 is increased to a point where the needle valve 14 is lifted from its seat, the fuel passage 26 is uncovered as seen in FIGURE 2 permitting fuel to be diverted to and forced into the chamber 36. The fuel injection characteristics is affected by the manner in which the fuel charge during each injection cycle is introduced into the combustion chamber and the manner in which the fuel charge is introduced into the combustion chamber is influenced by the rate, change of rate and the quantity of fuel which enters the chamber 36 during the injection cycle. This is partly due to the fact that the total amount of fuel injection to the engine cylinder through the orifice 24 is decreased as some of the fuel goes into the chamber 36. Thus by controlling the rate, change of rate and quantity of fuel entering the passage 26 and eventually the chamber 36 the fuel injection characteristic can be varied to improve engine performance. By this means, objectionable initial high rates of injection can be cut down as a certain quantity of fuel is diverted to the chamber 36 through passages 28 and 26. It will also be appreciated that the point in time during the injection cycle that the fuel commences to flow into the chamber 36 and distance the needle valve 14 moves axially between its fully opened and closed positions (needle lift) also influence the fuel injection characteristics. From the foregoing, it will be apparent that the size of passage 26, the shape and volume of chamber 36, as well as the axial disposition of the shoulder 42 with respect to the opening of the passage 26 in the bore 16 when the needle valve 14 is in its fully opened and closed positions, all influence the rate and the change of rate of fuel entering the combustion chamber during each injection cycle and can be varied to control the fuel injection characteristic as desired. Thus by varying the axial disposition of the shoulder 42 with respect to the passage 26 or the axial spacing between the passage 26 and the shoulder 42 when the needle valve 14 is in its closed position, the precise moment during each injection cycle that fuel is diverted from the engine combustion chamber can be chosen as desired so as to control the rate and quantity of fuel entering the combustion chamber throughout the entire injection cycle. Also, by varying the needle valve lift or the disposition of the shoulder 42 with respect to the passage 26 where it opens into the chamber 36, so as to establish the maximum cross sectional area size provided for fuel to flow into the chamber 36, the rate at which fuel can be diverted from the engine combustion chamber and into the chamber 36 can be controlled which, in turn, is effective, to control the rate and change of rate of the fuel charge entering the combustion chamber during each injection cycle.

During the dwell period, that is, when the needle valve 14 is closed, fuel will leak past the shoulder 42 of the needle valve from the chamber 36 and flow into the leak-off system to relieve the pressure in the chamber 36. The leakage will be a controlled amount depending on the amount of clearance provided between the shoulder 42 of the needle valve and the valve body 12. This clearance may be varied as it will affect the volume available in chamber 36 for receiving diverted fuel on succeeding injection cycles.

Figure 4:
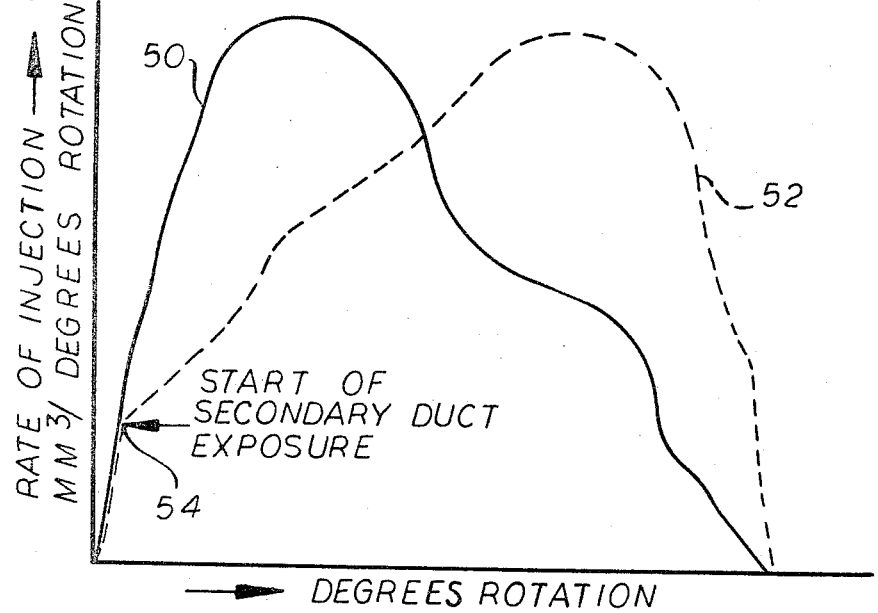
FIGURE 4 is a rate of injection diagram showing a rate of injection curve and a modified rate of injection curve resulting from the invention disclosed herein.

An illustration of how the fuel injection characteristic may be varied is illustrated in the diagram of FIGURE 4. A full line 50 shows an unmodified injection curve. A dotted line 52 shows an injection curve wherein the injection rate has been reduced during the first part of the injection cycle. The point in the cycle at which the secondary passage or duct 26 commences to be uncovered or exposed by the lift of the needle valve 14 is indicated at 54 on the diagram. At that point fuel begins to be diverted into chamber 36 causing an initial pressure drop in the main fuel passage 20 and fuel chamber 21. This results in a slightly smaller amount of fuel being injected into the cylinder. As the chamber 36 fills, the pressure of the fuel entering the main fuel passage 20 and fuel chamber increases and the amount of fuel injected is increased during the latter part of the injection cycle as shown by curve 52. Thus, it will be observed that initial high rate of injection is reduced, and the high rate of injection takes place more toward the end of the injection cycle.

The fuel in the chamber 36 also provides a damping influence due to the shearing friction set up between the fuel and the outer edges 44 and 46 associated with the groove in the needle valve. This helps to reduce needle bounce and objectionable dribbling which often results at the end of the injection cycle.

The operation of the improved fuel injection nozzle 10 may be briefly summarized as follows. When fuel from a fuel injection pump (not shown) is supplied under pressure to the fuel injection nozzle 10, the fuel pressure in the fuel chamber 21 acts on the underside 40 of the needle valve 14 lifting it from its seat 22 against the force of the spring 38. In the initial injection cycle, the passage 26 becomes exposed as the needle valve moves upward thus permitting fuel to fill the chamber 36. On this initial injection cycle, the fuel available for injection is decreased by the amount which enters chamber 36, thus decreasing the undesirable high fuel injection rate. On subsequent injection cycles the chamber 36 is already filled with fuel but the pressure thereof has been relieved and is the same as that prevailing in the fuel leak-off system since the clearance provided between the shoulder 42 and the bore 16 permits such fluid pressure relief.

Thus it will be apparent that I have advantageously provided a fuel injection nozzle constructed in a manner to divert a portion of the pressurized fuel during the initial portion of the injection cycle. This has the advantage of reducing undesirable initial high rates of injection, reducing the amount of fuel subjected to incomplete combustion, resulting in increased efficiency of engine performance.

While a specific embodiment of the invention has been illustrated and described, it is to be understood that the invention is not limited thereto as other variations will be apparent to those skilled in the art and the invention is to be given its fullest possible interpretation within the terms of the following claims.

What is claimed is:

1. A fuel injector device comprising: a valve body having a bore formed therein, said bore being in fluid communication with a source of fuel under pressure; outlet orifice means formed in said valve body; valve means operatively interposed between one end of said bore and said outlet orifice means and including a valve seat formed in said valve body adjacent to said outlet orifice means, said valve means further including a valve element in the form of an elongated needle valve having a section thereof coaxially disposed in said bore, said valve element being movable between an open position and a closed position for controlling the flow of fuel from said bore, one end of said needle valve being in engagement with said valve seat in said closed position; said section of said needle valve disposed in said bore having a diameter less than the diameter of said bore, said needle valve further having an enlarged section being provided with an annular groove intermediate its ends; biasing means yieldably urging said valve element to its closed position, said valve means being responsive to a predetermined pressure of fuel in said bore to initiate movement of said valve element from said closed position toward said open position; chamber means partially defined by a second elongated bore having its longitudinal axis in alignment with the longitudinal axis of said first mentioned bore, said enlarged section of said needle valve being slidable in said second bore and the surfaces of said annular groove partially defining said chamber means; and means responsive to movement of said valve element from said closed position toward said open position to effect fluid communication between said chamber means and said source of fuel under pressure.

2. A fuel injector device as set forth in claim 1, wherein said enlarged section extends from one end of said needle valve; and including passage means in fluid communication with said source of fuel under pressure and having one end opening into said chamber means; and said means responsive to movement of said valve element from said closed position toward said open position includes a portion of said valve element, said portion covering the end of said passage means opening into said chamber means when said valve element is in said closed position; the end of said passage means being uncovered during movement of said valve element from said closed position toward said open poistion, and said valve element portion covering the end of said passage means opening into said chamber means when said valve element is in said closed position is that part of said needle valve enlarged section extending from said groove to said one end of said needle valve.

3. A fuel injector device as set forth in claim 2, including means for relieving the pressure of the pressurized fuel received in said chamber means whenever said valve element portion is covering the end of said passage means opening into said chamber means.

4. A fuel injector device as set forth in claim 3, wherein the outer surface of said part of said needle valve enlarged section extending from said groove to said one end of said needle valve which faces the surface defining said second bore is spaced from such bore surface to provide a clearance space, said clearance space serving as said means for relieving the pressure of the pressurized fuel received in said chamber means whenever said valve element portion is covering the end of said passage means opening into said chamber means.

References Cited

UNITED STATES PATENTS

| 1,967,987 | 7/1934 | Broege | 239—533 |
| 2,071,237 | 2/1937 | Rupprecht | 239—90 |
| 2,283,725 | 5/1942 | Eichelberg | 239—533 |
| 2,602,703 | 7/1952 | Camner | 239—533 |

EVERETT W. KIRBY, *Primary Examiner.*

U.S. Cl. X.R.

239—453, 584